United States Patent [19]
Grolemund

[11] Patent Number: 6,047,338
[45] Date of Patent: Apr. 4, 2000

[54] SYSTEM FOR TRANSFERRING A DATA DIRECTLY FROM/TO AN ADDRESS SPACE OF A CALLING PROGRAM UPON THE CALLING PROGRAM INVOKING A HIGH PERFORMANCE INTERFACE FOR COMPUTER NETWORKS

[75] Inventor: Steven C. Grolemund, Poway, Calif.

[73] Assignee: NCR Corporation, Dayton, Ohio

[21] Appl. No.: 08/903,111

[22] Filed: Jul. 30, 1997

[51] Int. Cl.[7] .................................................. G06F 13/14
[52] U.S. Cl. ................. 710/33; 710/19; 710/39; 710/56; 710/112; 709/212; 709/218
[58] Field of Search ........................... 395/200.3, 200.57, 395/200.6; 709/212, 218; 710/19, 33, 39, 56, 112

[56] References Cited

U.S. PATENT DOCUMENTS

| | | | |
|---|---|---|---|
| 5,437,013 | 7/1995 | Rubin et al. | 709/230 |
| 5,519,845 | 5/1996 | Birch et al. | 711/118 |
| 5,689,566 | 11/1997 | Nguyen | 380/25 |
| 5,805,920 | 9/1998 | Sprenkle et al. | 710/1 |

OTHER PUBLICATIONS

Steenkiste, Peter A. —Carnegie Mellon University, *A Systematic Approach to Host Interface Design for High–Speed Networks*, Mar. 1994, pp. 47–57.

*Primary Examiner*—Thomas C. Lee
*Assistant Examiner*—Ilwoo Park
*Attorney, Agent, or Firm*—Gates & Cooper

[57] ABSTRACT

The present invention discloses a method, apparatus, and article of manufacture comprising a high performance interface for sending data to a remote device and receiving data from a remote device via a data communications device coupled to a processor. In performing these functions, the high performance interface supports asynchronous input/output operations. Moreover, the high performance interface transfers the data directly to and from the address space of a calling program, thereby eliminating use of intermediate buffers. In those instances where the calling program has not invoked the high performance interface, data can be stored in the address space of the operating system until the high performance interface is invoked by the calling computer program. Further, status can be returned to a remote device using back-channel capabilities.

16 Claims, 2 Drawing Sheets

SYSTEM FOR TRANSFERRING A DATA DIRECTLY FROM/TO AN ADDRESS SPACE OF A CALLING PROGRAM UPON THE CALLING PROGRAM INVOKING A HIGH PERFORMANCE INTERFACE FOR COMPUTER NETWORKS

BACKGROUND OF THE INVENTION

1. Field of the Invention

The invention relates in general to massively parallel computer systems, and more particularly, to a high performance interface for an interconnect of a massively parallel computer system.

2. Description of Related Art

Networked computer systems are well known in the art. Frequently, such systems comprised of multiple, individual computers, each with their own processors (CPUs), memory, and data storage units. Such networks allow tasks to be executed in parallel by utilizing each processor as a part of the whole.

Typically, in networked computer systems, there is a large amount of message traffic between processors. The viability of such loosely-coupled processors is strongly determined by the bandwidth of the network relative to the characteristics of the processors and their input/output subsystems.

In order to fully utilize a network's bandwidth and reduce latency, many vendors have devised optimized communications services. Nonetheless, there is still a need in the art for communications services that maximizes the performance of message traffic across a network.

SUMMARY OF THE INVENTION

To overcome the limitations in the prior art described above, and to overcome other limitations that will become apparent upon reading and understanding the present specification, the present invention discloses a method, apparatus, and article of manufacture comprising a high performance interface for sending data to a remote device and receiving data from a remote device via a data communications device coupled to a processor. In performing these functions, the high performance interface supports asynchronous input/output operations. Moreover, the high performance interface transfers the data directly to and from the address space of a calling program, thereby eliminating use of intermediate buffers. In those instances where the calling program has not invoked the high performance interface, data can be stored in the address space of the operating system until the high performance interface is invoked by the calling computer program. Further, status can be returned to a remote device using back-channel capabilities.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

High Performance Interface

The High Performance Interface (HPI) provides connectionless datagram service and supports asynchronous input/output (i/o) operations on a network. In the preferred embodiment, the HPI provides these services for a Bynet® network, which is a high-speed circuit-switched interconnect network. The Bynet® network is described in the co-pending and commonly-assigned U.S. patent application Ser. No. 08/656,007, filed May 24, 1996, by Robert J. McMillen et al., now U.S. Pat. No. 5,872,904, entitled "A COMPUTER SYSTEM USING A MASTER PROCESSOR TO AUTOMATICALLY RECONFIGURE FAULTY SWITCH NODE THAT IS DETECTED AND REPORTED BY DIAGNOSTIC PROCESSOR WITHOUT CAUSING COMMUNICATIONS INTERRUPTION", which is a continuation of U.S. Pat. No. 5,522,046, filed Jun. 3, 1994, and issued May 28, 1996, which is a continuation of U.S. Pat. No. 5,321,813, filed May 1, 1991, and issued Jun. 14, 1994, all of which are incorporated by reference herein.

The HPI is a pseudo-device driver that provides a high speed interface to send and receive messages on the network. The HPI also provides features and functionality which are unusual in communications interfaces.

First, in normal operation, the HPI transfers data directly to or from the address space of the calling program. Intermediate buffers obtained from the address space of the operating system need not be used. This eliminates memory-to-memory copies which adversely affect the performance of other solutions. Moreover, the HPI does this without utilizing daemons which inherit the address space of the calling program. This architecture reduces the number of processes required in the system and therefore, the number of time-consuming context switches.

Second, the HPI can optionally be configured to use a predefined amount of the address space of the operating system to accept message even if the calling program has not submitted a read i/o operation on the port. This requires a copy to the address space of the operating system, but reduces the re-transmission of messages. The amount of memory available for these copies is configurable and may be set to 0 if this option is not desired.

Third, the HPI uses the capabilities of the network to provide status on the outcome of each message transfer. The status is immediately returned via the back-channel of the network, potentially eliminating the need for higher level protocols to keep copies of messages until a confirmation is received from the destination.

The HPI accomplishes two major goals: the highest performance possible over the network and completely asynchronous operation, as described in more detail below.

Hardware Environment

Figure 1:
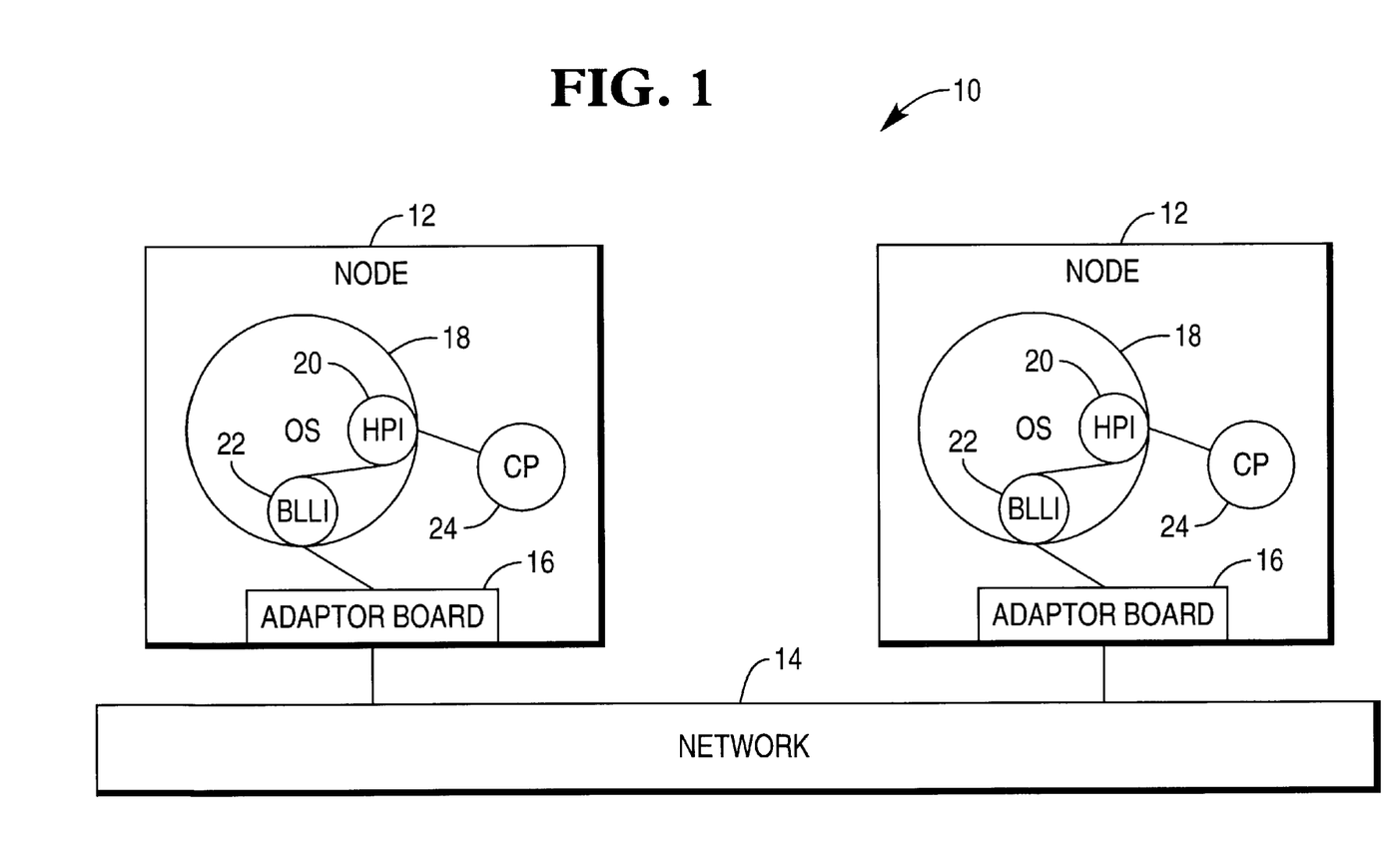
FIG. 1 is a block diagram that illustrates an exemplary computer hardware environment that could be used with the present invention.

FIG. 1 is a block diagram that illustrates an exemplary computer hardware environment that could be used with the present invention. In the exemplary computer hardware environment, a massively parallel processor (MPP) computer system 10 is illustrated. The MPP computer system 10 is comprised of a plurality of processor nodes 12 interconnected by a network 14, wherein each of the nodes 12 includes an adaptor board 16 for connecting to the network 14. Each of the nodes 12 may be comprised of one or more microprocessors, random access memory (RAM), read-only memory (ROM), and other components. It is envisioned that attached to each of the nodes 12 may be one or more fixed and/or removable data storage units (not shown) and/or one or more data communications devices (not shown). Of course, those skilled in the art will recognize that the exemplary environment illustrated in FIG. 1 is not intended to limit the present invention. Indeed, those skilled in the art will recognize that other alternative hardware environments may be used without departing from the scope of the present invention.

Each of the nodes 12 operates under the control of an operating system (OS) 18, such as Windows NT® or Unix® operating systems. The operating system 18 also includes one or more HPI pseudo-device drivers 20 and Bynet Low Latency Interface (BLLI) device drivers 22, as well as other drivers and components. Further, each of the nodes 32 executes one or more computer programs under the control of the operating system 18, wherein the computer program is known as calling program (CP) 24 for the purposes of this specification.

Generally, the operating system 18, HPI pseudo-device driver 20, BLLI device driver 22, and calling program 24 are all tangibly embodied in and/or readable from RAM, ROM, and/or the data storage devices or data communications devices. Further, the operating system 18, HPI pseudo-device driver 20, BLLI device driver 22, and calling program 24 are loaded into the memory of the node 12 for execution. In any embodiment, the operating system 18, HPI pseudo-device driver 20, BLLI device driver 22, and calling program 24 comprise instructions which, when read and executed by the node 12, causes the node 12 to perform the steps necessary to execute the steps or elements of the present invention.

HPI Embodiments

There are two preferred embodiments of the HPI pseudo-device driver 20: one implemented under the Unix operating system 18 and one implemented under the Windows NT operating system 18. The main difference is that the Windows NT operating system 18 supports asynchronous i/o operations, whereas the Unix operating system 18 does not and thus the Unix implementation of the HPI pseudo-device driver 20 must provide these capabilities.

In the Unix implementation of the HPI pseudo-device driver 20, supporting asynchronous i/o operations means that two system calls are required: one to start the i/o operation(s) and the other to complete them. In the Windows NT implementation of the HPI pseudo-device driver 20, however, this is not the case, because the standard Windows NT system calls support asynchronous i/o operations, and thus only one system call is required to both start and complete an i/o operation.

Windows NT avoids the need for two system calls by completing the i/o operations using Asynchronous Procedure Calls (APCs). APCs are "deferred" procedure calls that are executed in the address space of the calling program 24. Thus, the HPI pseudo-device driver 20 completes i/o operations by calling the IoCompleteRequest function of Windows NT, which results in the I/O Manager of Windows NT queuing an APC for the calling program 24. The APC then copies the status from the address space of the operating system 18 to the address space of the calling program 24.

Since i/o operations are completed "on the fly", the HPI pseudo-device driver 20 implemented in Windows NT has no need for completion queues. In the Unix implementation of the HPI pseudo-device driver 20, however, completion queues store completed requests. The only tasks remaining for the HPI 20 to perform for these completed requests is to return status to the calling program 24, possibly copy data, and perform any required cleanup (e.g., release the operating system's 18 memory). Requests which are completed then wait for the calling program 24 to remove them from the completion queues.

HPI Ports

The HPI pseudo-device driver 24 defines one or more "ports" that are used to perform i/o operations between a node 12 and the network 14. To accomplish this, an HPI port is opened by the calling program 24 using an Open (Unix) or CreateFile (Windows NT) system call. When a port is opened, it is typically used exclusively by the calling program 24. When the port is closed, it becomes available for use by another program.

Generally, these are two types of opens in the Unix implementation of the HPI pseudo-device driver 20: a normal open and a clone open. In a normal open, the port to be opened is specified, and if the port is available (and no other errors occur), then the open system call succeeds. If the user needs a port, but doesn't care which specific port is opened (e.g., if a port is used for writing messages only), then a clone open can be used. In a clone open, a clone port is specified. In either instance, a file descriptor is returned upon successful completion of the open system call.

Unlike the Unix implementation, clone devices are not supported in the Windows NT implementation of the HPI pseudo-device driver 20. However, it is not considered a problem to attempt to open ports until a free one is found.

Starting an Asynchronous I/O Operation

Asynchronous i/o operations, whether reads or writes, are generally known as requests. These requests are started by the calling program 24 invoking an asynchronous i/o system call to the HPI pseudo-device driver to, wherein the i/o system call is known as the HPI_ASYNC_RW ioctl in Unix and DeviceIoControl in Windows NT.

The following structure is passed to the i/o system call in both implementations of the HPI pseudo-device driver 20:

```
typedef struct hpi_async_rw_request
{
    uint cmplt_param;
    ulong type;
    hpi_host_type host_addr;
    hpi_port_type port;
    ulong buffer_size;
    char *buffer_addr;
} hpi_arr_t;
```

The cmplt_param (completion parameter) is an identifier specified by the calling program 24 and associated with the request that is used to identify the i/o operation when it has completed.

The type is the type of i/o operation requested, either a read (indicated by HPI_ASYNC_READ) or a write (indicated by HPI_ASYNC_WRITE).

The next two fields are significant only if the i/o operation is a write. The host_addr is the remote host's Internet Protocol (IP) address and the port is the minor number of the destination port.

The buffer_size is the size of the message to send or the size of the buffer on receives.

The buffer_addr is a pointer to the buffer to be sent, or a pointer to the area in memory where the message is to be received.

In the Unix implementation, multiple requests can be scheduled in one i/o system call (not in the Windows NT implementation, however). To support this, an additional structure is defined:

```
typedef struct hpi_async_rw_ioctl
{
    uint nreqs;
    hpi_arr_t *req;
} hpi_ari_t;
```

The nreqs is the number of requests to schedule.

The *req is a pointer to the first of the hpi_async_rw_ request structures for those requests. In many cases, the number of i/o operations will be one and this will simply point to one hpi_async_rw_request structure.

Scheduling multiple i/o operations per i/o system call can increase performance by reducing the number of system calls and the overhead associated with them. Upon successful completion of the i/o operation, a value of 0 is returned. Otherwise, a value of −1 is returned and an error number variable is set to one of the values of Table 1. Note that an error occurs, none of the i/o operations in the i/o system call are scheduled.

Completing an Asynchronous I/O Operation

Asynchronous i/o operations, whether reads or writes, are completed in the Unix implementation of the HPI pseudo-device driver 20 using a completion system call, wherein the completion system call is known as the HPI_RW_CMPLT ioctl in Unix. A completion structure is passed to the completion system call to obtain the results of the i/o operation.

In the Windows NT implementation of the HPI pseudo-device driver 20, a completion system call is not used to complete an i/o operation. The i/o system call completes as a normal function of the asynchronous nature of windows NT. Thus, only one system call is required both for initiation and completion of the request, wherein the calling program 24 passes both the request structure and the completion structure to the HPI pseudo-device driver 20.

The hpi_cmplt_ioctl structure defined below comprises the completion structure:

```
typedef struct hpi_cmplt_request
{
    uint cmplt_param;
    uint cmplt_status;
    uint bytes_xfrd;
    hpi_host_type src_host;
    hpi_port_type src_port;
} hpi_cr_t;
```

The cmplt_param (completion parameter) is a unique identifier specified by the calling program 24 that is associated with the request. It is the same value that was passed in the i/o system call. This parameter identifies which request has completed.

The cmplt_status (completion status) describes the outcome of the i/o operation.

The bytes_xfrd (bytes transferred) tells the calling program 24 how many bytes were transferred in the i/o operation. For messages sent, this value should match the buffer_size parameter in the corresponding hpi_async_rw_request structure. For messages received, this value should be less than or equal to the buffer_size parameter, if the message is smaller than the buffer size, the bytes_xfrd specifies the length of the received message.

The src_host (source host) parameter tells the calling program 24 which host sent the received message. This value is in the format of an Internet Protocol (IP) address.

The src_port (source port) parameter specifies the minor number of the port on the sending host that sent the message.

Multiple completion structures may be passed to the completion system call in the Unix implementation (but not the Windows NT implementation). To support this functionality, an additional structure is defined and passed to the completion system call (indirectly in the Unix implementation):

```
typedef struct hpi_cmplt_ioctl
{
    uint type;
    uint ncmplts;
    hpi_cr_t *cmplt;
} hpi_ci_t;
```

The type may indicate reads, writes, or both.

The ncmplts is the number of structures passed.

The *cmplt is a pointer to the first of these structures.

Scheduling multiple requests per completion system call can increase performance by reducing the number of calls and the overhead associated with each of the calls. The type should be HPI_READ_CMPLT, HPI_WRITE_CMPLT, or both. If both are specified, the receive (i.e., read) queue is always searched first. If ncmplts requests are found on the receive queues, the send (i.e., write) queues is not searched. Upon successful completion, the number of requests that completed are returned. Otherwise, a value of −1 is returned and an error number variable is set to one of the values in Table 1.

Polling an Asynchronous I/O Operation

In the Unix implementation of the HPI pseudo-device driver 20, a poll of the status of pending requests is invoked using a polling system call, wherein the polling system call is known as POLL in Unix and WaitForSingleObject or WaitForMultipleObjects in Windows NT. The polling system call can be used to detect for completions of the i/o operations. The polling system call returns immediately (whether an event occurred or not), if a time-out value of zero is passed. However, the polling system call "sleeps" the specified number of milliseconds, if a time-out value is given. A time-out value of "infinite time" indicates that the i/o operation is, in fact, synchronous, and the polling system call does not complete until an event occurs or the operation is interrupted.

The Windows NT implementation of the HPI pseudo-device driver 20 is different in that only one i/o system call is required to both start and complete an i/o operation. Moreover, each i/o system call only handles one request. Because of the asynchronous nature of Windows NT, the completion queue is, in effect, in the address space of the calling program 24. Therefore, when the polling system call is invoked, it first checks for completed requests in the address space of the calling program 24. If the address space of the calling program 24 contains completed requests, the polling system call returns immediately to the calling program 24 with this information.

Canceling an Asynchronous I/O Operation

Asynchronous i/o operations are canceled in both the Unix and Windows NT implementations of the HPI pseudo-device driver 20 using a cancel system call, wherein the cancel system call is known as the HPI_CANCEL ioctl in Unix and DeviceIoControl in Windows NT. This is particularly useful for read operations, because many reads may be pending at a time. Typically, write operations complete before they can be canceled.

The hpi_cancel_ioctl structure defined below is passed to the cancel system call:

```
typedef struct hpi_cancel_ioctl
{
    uint flags;
} hpi_cancel_t;
```

The flags identifies what request to cancel. Table 2 defines the flags that may be passed to the cancel system call.

Upon successful completion, the number of canceled requests is returned to the calling program.

Note that the types of cancels available are different in the Windows NT implementation than in the Unix implementation. In the Windows NT implementation, there are no completion queues, so HPI_CANCEL_RCV_CMPLT and HPI_CANCEL_SEND_CMPLT are not used. Also note that sends cannot be canceled after they have been passed to the BLLI 22, and in most cases this happens almost immediately when the send request is started. Under some situations, a send request is placed on the pending request send queue and in this case it can be canceled. Receive requests also cannot be canceled once they are passed to the BLLI 22, but typically receive requests exist for a while on the pending request receive queue in the HPI 20 waiting for a message to arrive.

HPI Port Structure in Windows NT

In the Windows NT implementation of the HPI pseudo-device driver 20, most i/o operations involve a port structure as defined below:

```
typedef struct
{
    peprocess process;
    uint flags;
    minor_t minor;
    hpi_queue_t rx_pending;
    hpi_queue_t rx_active;
    hpi_queue_t rx_unattached;
    hpi_queue_t tx_active;
    hpi_stats_t stats;
} hpi_port_t;
```

The process is the identifier of the calling program 24 that opened (and should exclusively use) the port.

The flags are the flags that were passed to the open system call when the port was opened.

The minor is the port's minor number.

The stats holds port-specific statistics.

The other structures are receive and send queues. These queues are described in the following paragraphs.

Windows NT Receive Queues

In the Windows NT implementation of the HPI pseudo-device driver 20, there are three receive queues for each port: a pending request receive queue (rx_pending), an active request receive queue (rx_active), and an unattached message queue (rx_unattached).

When the calling program 24 performs an i/o system call of type HPI_ASYNC_READ, the HPI 20 places the receive request on the pending request receive queue. The request remains on that queue (unless it is canceled) until a message destined for the port is received by the BLLI 22 from the network 14.

After receiving a message from the network 14, the BLLI 22 determines (by looking at the message header) that the message is destined for a particular session (e.g., HPI 20). The BLLI 22 then invokes the HPI 20 to acquire a receive request from the pending request receive queue.

If a request is available, the HPI 20 dequeues the request from the pending request receive queue and places the request on the active request receive queue. The information from the request (e.g., the location and size of the message) is returned by the HPI 20 to the BLLI 22. The BLLI 22 uses this information to build a channel program, which is then executed to return a status via the back-channel of the network 14 to the sender, as is described in the co-pending and commonly-assigned U.S. patent application Ser. No. 08/656,007, filed May 24, 1996, by Robert J. McMillen et al., now U.S. Pat. No. 5,872,904, entitled "A COMPUTER SYSTEM USING A MASTER PROCESSOR TO AUTOMATICALLY RECONFIGURE FAULTY SWITCH NODE THAT IS DETECTED AND REPORTED BY DIAGNOSTIC PROCESSOR WITHOUT CAUSING COMMUNICATIONS INTERRUPTION", which is a continuation of U.S. Pat. No. 5,522,046, filed Jun. 3, 1994, and issued May 28, 1996, which is a continuation of U.S. Pat. No. 5,321,813, filed May 1, 1991, and issued Jun. 14, 1994, all of which are incorporated by reference herein.

When the channel program completes, the HPI 20 dequeues the request from the active request receive queue and performs various housekeeping functions, like updating statistics and returning resources to the operating system 18. Thereafter, the HPI 20 invokes the IoCompleteRequest function of Windows NT to inform Windows NT that the receive request of the calling program 24 is complete and returns the request to the calling program 24.

If, when the message arrives, there is no receive request on the pending request receive queue, the HPI 20 copies the message into a buffer in the address space of the operating system 18 (if available) and places the buffer in the unattached message queue. Any i/o system call of type HPI_ASYNC_READ made by the calling program 24 causes the HPI 20 to check the unattached message queue before placing the request on the active request receive queue. If the HPI 20 finds a buffer on the unattached message queue, it dequeues the buffer from the unattached message queue, copies the message from the address space of the operating system 18 to the address space of the calling program 24, and invokes the IoCompleteRequest function of Windows NT to inform Windows NT that the receive request of the calling program 24 is complete and returns the request to the calling program 24.

Windows NT Send Queues

In the windows NT implementation of the HPI pseudo-device driver 20, there is only an active request send queue (tx_active) for each HPI 20 port, although there is a global pending request send queue (hpi_tx_pending), which is used if the BLLI 22 already has its limit of pending send requests.

When the calling program 24 performs an i/o system call of type HPI_ASYNC_WRITE, the HPI 20 places the send request on the active request send queue. The information in the request (i.e., the location and size of the message in the address space of the calling program 24) is then passed to the BLLI 22, which builds a channel program to transmit the message to the network 14. When the channel program completes, the BLLI 22 determines the outcome of the channel program and then invokes the HPI 20 to dequeue the send request from the active request send queue and to invoke the IoCompleteRequest function of Windows NT to complete the i/o operation.

If the BLLI 22 cannot accept the send request, the HPI 20 places it on the global pending request send queue. At the expiration of every hpi_timeout_period, if the global pending request send queue is not empty, the HPI 20 attempts to re-start these pending send requests. Note that the value of hpi_timeout_period may be adjusted as desired.

Note also that only requests on the global pending request send queue may be canceled. Requests on the active request send queue are under the control of BLLI 22 and may not be canceled.

HPI Port Structure in Unix

In the Unix implementation of the HPI pseudo-device driver 20, most i/o operations involve a port structure as defined below:

```
typedef struct
{
    pid_t pid;
    uint flags;
    minor_t minor;
    hpi_queue_t rx_ending;
    hpi_queue_t rx_active;
    hpi_queue_t rx_completed;
    hpi_queue_t rx_unattached;
    hpi_queue_t tx_active;
    hpi_queue_t tx_completed;
    struct pollhead *pollp;
    hpi_stats_t stats;
} hpi_port_t;
```

The pid is the process identifier of the calling program 24 that opened (and should exclusively use) the port.

The flags are the flags that were passed to the open system call when the port was opened.

The minor is the port's minor number.

The pollp points to a pollhead structure associated with the port.

The stats holds port-specific statistics.

The other structures are receive and send queues. These queues are described in the following paragraphs.

Unix Receive Queues

In the Unix implementation of the HPI pseudo-device driver 20, there are four receive queues for each port: a pending request receive queue (rx_pending), an active request receive queue (rx_active), a completed request receive queue (rx_completed), and an unattached message queue (rx_unattached).

When the calling program 24 performs an i/o system call of type HPI_ASYNC_READ, it causes the HPI 20 to place the receive request on the pending request receive queue. The receive request remains on the pending request receive queue (unless it is canceled) until a message destined for the HPI 20 port is received by the BLLI 22 from the network 14.

After receiving a message from the network 14, the BLLI 22 determines (by looking at the message header) that the message is destined for a particular session (e.g., HPI 20). The BLLI 22 then invokes the HPI 20 to acquire a receive request from the pending request receive queue.

If a request is available, the HPI 20 dequeues the request from the pending request receive queue and places the request on the active request receive queue. The information from the request (e.g., the location and size of the message in the address space of the calling program 24) is returned by the HPI 20 to the BLLI 22. The BLLI 22 uses this information to build a channel program, which is then executed to return a status via the back-channel of the network 14 to the sender, as is described in the co-pending and commonly-assigned U.S. patent application Ser. No. 08/656,007, filed May 24, 1996, by Robert J. McMillen et al., now U.S. Pat. No. 5,872,904, entitled "A COMPUTER SYSTEM USING A MASTER PROCESSOR TO AUTOMATICALLY RECONFIGURE FAULTY SWITCH NODE THAT IS DETECTED AND REPORTED BY DIAGONOSTIC PROCESSOR WITHOUT CAUSING COMMUNICATIONS INTERRUPTION", which is a continuation of U.S. Pat. No. 5,522,046, filed Jun. 3, 1994, and issued May 28, 1996, which is a continuation of U.S. Pat. No. 5,321,813, filed May 1, 1991, and issued Jun. 14, 1994, all of which are incorporated by reference herein.

When the channel program completes, the HPI 20 dequeues the request from the active request receive queue and places it on the completed request receive queue. Thereafter, the HPI 20 performs various housekeeping functions, like updating statistics, returning resources to the operating system 18, and invoking a pollwakeup function that informs any programs that are polling the HPI 20 port that a read i/o operation has completed. The request remains on the completed request receive queue until a completion system call causes the HPI 20 to dequeue the request and return it to the calling program 24.

If, when the message arrives, there is no receive request on the pending request receive queue, then the HPI 20 copies the message into a buffer in the address space of the operating system 18 (if available) and places the buffer on the unattached message queue. Any i/o system call of type HPI_ASYNC_READ made by the calling program 24 causes the HPI 20 to check the unattached message queue before placing the request on the pending request receive queue. If the HPI 20 finds a buffer on the unattached message queue, it dequeues the buffer, copies the message in the address space of the operating system 18 to the address space of the calling program 24, calls the pollwakeup routine to inform any programs polling the HPI 20 port that an i/o operation completed, and places the request directly on the completed request receive queue.

Unix Send Queues

In the Unix implementation of the HPI pseudo-device driver 20, there are two send queues for each port: a pending request send queue (tx_pending) and a completed request send queue (tx_completed).

When the calling program 24 performs an i/o system call of type HPI_ASYNC_WRITE, the HPI 20 places the send request on the pending request send queue. The information in the request (e.g., the location and size of the message) is then passed to the BLLI 22, which builds a channel program to transmit the message to the network 14. When the channel program completes, the BLLI 22 determines the outcome of the channel program and then invokes the HPI 20 to update the request by dequeueing it from the pending request send queue and placing it on the completed request send queue and to invoke the pollwakeup function to inform any programs polling the HPI 20 port that an i/o operation completed. The send request remains on the completed request send queue until a completion system call by the calling program 24 causes the HPI 20 to dequeue the request and return it to the calling program 24.

Logic of the HPI

Figure 2:
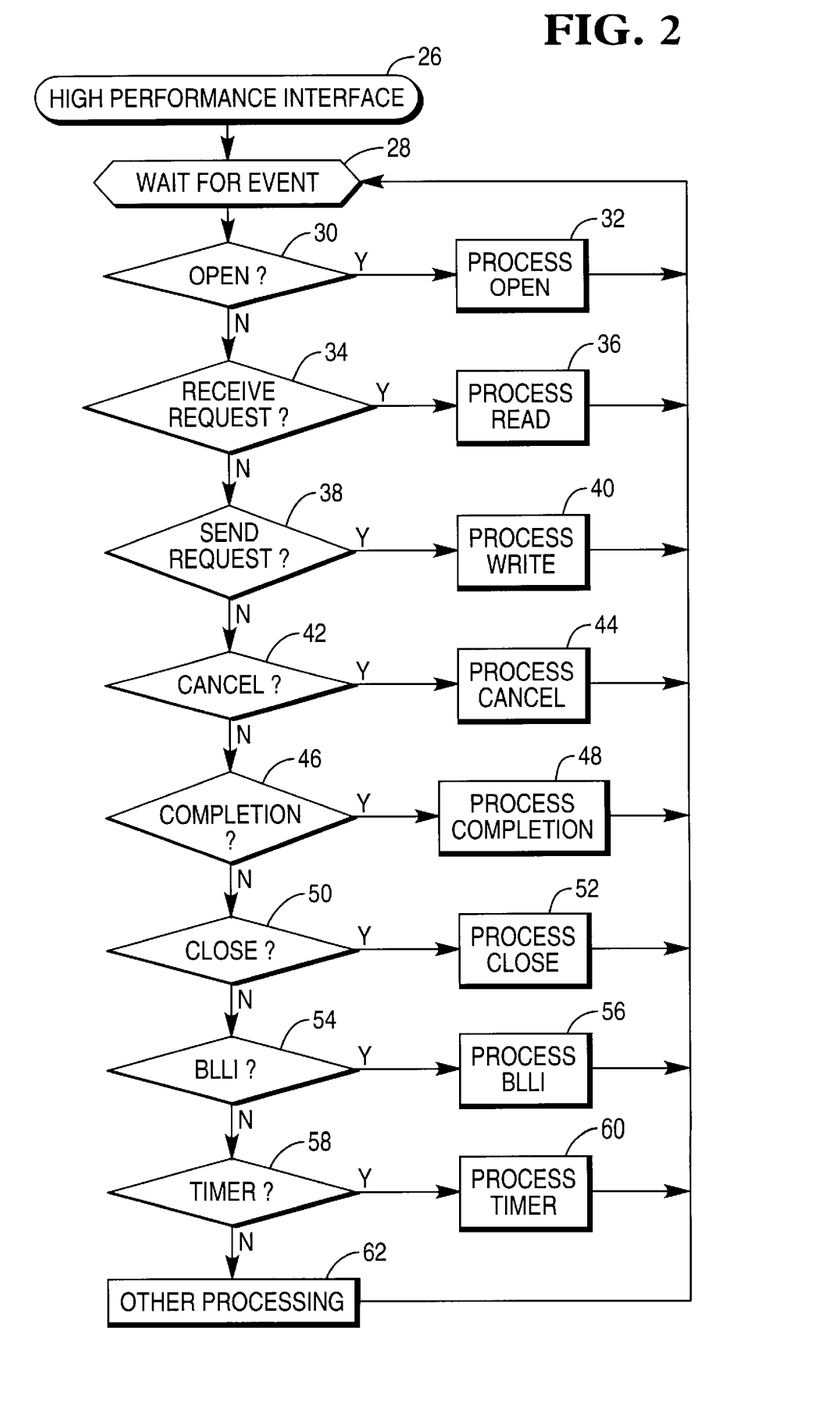
FIG. 2 is a flowchart illustrating the logic of the high performance interface according to the present invention.

FIG. 2 is a flowchart illustrating the logic of the HPI 20 according to the present invention. Of course, those skilled in the art will recognize that other logic could be used in the HPI 20 without departing from the scope of the present invention.

Block 26 represents the start of the logic comprising the HPI 20 and Block 28 represents the HPI 20 waiting for the next event to occur.

Block 30 is a decision block that represents the HPI 20 determining whether the calling program invoked an open system call. If so, control transfers to Block 32, which represents the HPI 20 processing the open system call. Generally, when a port is opened, it is typically used exclusively by the calling program 24. Thereafter, control transfers back to Block 28 to wait for the occurrence of the next event.

Block 34 is a decision block that represents the HPI 20 determining whether the calling program invoked an i/o system call representing a receive request. If so, control transfers to Block 36, which represents the HPI 20 processing the receive request. More specifically, Block 36 represents the HPI 20 checking the unattached message queue for a message. If the HPI 20 finds a message on the unattached message queue, it dequeues the message, copies the message from the buffer in the address space of the operating system 18 to a buffer in the address space of the calling program 24, and invokes a pollwakeup function to inform any programs polling the HPI 20 port that an i/o operation completed. If the HPI 20 does not find a message on the unattached message queue, it places the receive request on the pending request receive queue, where it remains until a message destined for the port is received by the BLLI 22 from the network 14. Thereafter, control transfers back to Block 28 to wait for the occurrence of the next event.

Block 38 is a decision block that represents the HPI 20 determining whether the calling program invoked an i/o system call representing a send request. If so, control transfers to Block 40, which represents the HPI 20 processing the send request. More specifically, Block 40 represents the HPI 20 placing the send request on the active request send queue, passing the information in the request to the BLLI 22, which builds a channel program to transmit the message to the network 14, and updating and completing the send request when the channel program completes. If the BLLI 22 cannot accept the send request, the HPI 20 places it on a pending request send queue.

Block 42 is a decision block that represents the HPI 20 determining whether the calling program invoked a cancel system call. If so, control transfers to Block 44, which represents the HPI 20 processing the cancel system call. Thereafter, control transfers back to Block 28 to wait for the occurrence of the next event.

Block 46 is a decision block that represents the HPI 20 determining whether the calling program invoked a completion system call. If so, control transfers to Block 48, which represents the HPI 20 processing the completion system call. Thereafter, control transfers back to Block 28 to wait for the occurrence of the next event.

Block 50 is a decision block that represents the HPI 20 determining whether the calling program invoked a close system call. If so, control transfers to Block 52, which represents the HPI 20 processing the close system call. Thereafter, control transfers back to Block 28 to wait for the occurrence of the next event.

Block 54 is a decision block that represents the HPI 20 determining whether a BLLI 22 event occurred, i.e., the BLLI 22 received a message. If so, control transfers to Block 56, which represents the HPI 20 processing the BLLI 22 event.

When there is a pending receive request on the pending request receive queue, Block 56 represents the HPI 20 dequeueing a request from the pending request receive queue, copying the message from the BLLI 22 into the address space of the calling program 24 at the location indicated in the request, placing the request on the active request receive queue, and then returning information about the request to the BLLI 22, so that the BLLI 22 can return a status indication to the sender. When the channel program completes, the HPI 20 dequeues the request from the active request receive queue and completes the request by performing various housekeeping functions, such as updating statistics, returning resources to the operating system 18, optionally placing the receiving request on the completed request receive queue, and informing the calling program 24 that the receive request is complete.

When there is no pending receive request on the pending request receive queue, Block 56 represents the HPI 20 acquiring a buffer from the address space of the operating system 18, copying the message from the BLLI 22 into the buffer, and then placing the buffer on the unattached message queue.

In all of these instances, control then transfers from Block 56 to Block 28 to wait for the occurrence of the next event.

Block 58 is a decision block that represents the HPI 20 determining whether a timer expired. If so, control transfers to Block 60, which represents the HPI 20 processing the timer. More specifically, Block 60 represents the HPI 20 determining whether there are send requests in the pending request send queue and, if so, attempting to re-start the pending send requests. Thereafter, control transfers back to Block 28 to wait for the occurrence of the next event.

Block 62 represents the HPI 20 performing all other processing. Thereafter, control transfers back to Block 28 to wait for the occurrence of the next event.

Conclusion

This concludes the description of the preferred embodiment of the invention. The following describes some alternative embodiments for accomplishing the present invention.

For example, any type of computer, such as a mainframe, minicomputer, work station or personal computer, could be used with the present invention. In addition, any software program, application or operating system having a need for high-speed interface to a data communications device could benefit from the present invention.

In conclusion, a method, apparatus, and article of manufacture comprising a high performance interface for sending data to a remote device and receiving data from a remote device via a data communications device coupled to a processor. In performing these functions, the high performance interface supports asynchronous input/output operations. Moreover, the high performance interface transfers the data directly to and from the address space of a calling program, thereby eliminating use of intermediate buffers. In those instances where the calling program has not invoked the high performance interface, data can be stored in the address space of the operating system until the high performance interface is invoked by the calling computer program. Further, status can be returned to a remote device using back-channel capabilities.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer messaging apparatus, comprising:
   (a) a processor coupled to a data communications device; and
   (b) a high performance interface, executed by the processor, for sending data to a remote device and for receiving data from a remote device via the data communications device, where the high performance interface transfers the data directly to and from an address space of a calling computer program, executed by the processor, that invokes the high performance interface, thereby eliminating use of intermediate buffers obtained from an address space of an operating system executed by the processor,
      wherein the transferred data includes header information identifying a communications request it is associated with so that a plurality of communications requests can exist concurrently, and
      wherein the high performance interface stores the data in a predefined amount of the address space of the operating system prior to the calling computer program invoking the high performance interface.

2. The apparatus of claim 1, wherein the high performance interface supports asynchronous input/output operations.

3. The apparatus of claim 1, wherein the high performance interface manages one or more queues selected from a group of receive queues comprising a pending request receive queue for managing pending requests for a read operation, an active request receive queue for managing active requests for a read operation, a completed request receive queue for managing completed requests for a read operation, and an unattached message queue for managing completed, unrequests read operations.

4. A computer messaging apparatus, comprising:
   (a) a processor coupled to a data communications device; and
   (b) high performance interface, executed by the processor, for sending data to a remote device and for receiving data from a remote device via the data communications device, wherein the high performance interface transfers the data directly to and from an address space of a calling computer program, executed by the processor, that invokes the high performance interface, thereby eliminating use of intermediate buffers obtained from an address space of an operating system executed by the processor,
      wherein the transferred data includes header information identifying a communications request it is associated with so that a plurality of communications requests can exist concurrently, and
      wherein the high performance interface manages one or more queues selected from a group of send queues comprising an active request send queue, a completed request send queue, and a global pending request send queue.

5. The apparatus of claim 4, wherein the data communications device is coupled to network, the network is coupled to one or more other processors, and the remote device is one of the other processors.

6. The apparatus of claim 5, wherein the high performance interface uses capabilities of the network to return status on the transferred data to the remote device.

7. The apparatus of claim 4, wherein the high performance interface defines one or more ports that are used to perform input/output operations between the processor and data communications device.

8. The method of claim 7, further comprising the step of managing the received communications request using one or more queues stored in the memory of the computer.

9. The method of claim 8, queues are selected from a group of receive queues comprising a pending request receive queue for managing pending requests for a read operation, an active request receive queue for managing active requests for a read operation, a completed request receive queue for managing completed requests for a read operation, and an unattached message queue for managing completed, unrequested read operations.

10. A method of transferring data in a computer, comprising the steps of:
    (a) receiving a communications request from a calling computer program executed by the computer;
    (b) transferring data associated with the received communications request directly to and from an address space of the calling computer program to and from a remote device via a data communication device connected to the computer, thereby eliminating use of intermediate buffers obtained from an address space of an operating system executed by the computer,
       wherein the transferred data includes header information identifying the communications request it is associated with so that a plurality of communications requests can exist concurrently; and
    (c) managing the received communications request using one or more queues stored in the memory of the computer, wherein the queues are selected from a group of send queues comprising an active request send queue, a completed request send queue, and a global pending request send queue.

11. A method of transferring data in a computer, comprising the steps of:
    (a) receiving a communications request from a calling computer program executed by the computer;
    (b) transferring data associated with the received communications request directly to and from an address space of the calling computer program to and from a remote device via a data communication device connected to the computer, thereby eliminating use of intermediate buffers obtained from an address space of an operating system executed by the computer, wherein the transferred data includes header information identifying the communications request it is associated with so that a plurality of communications requests can exist concurrently; and (c) storing the data in a predefined amount of the address space of the operating system prior to receiving the communications request.

12. The method of claim 11, further comprising the step of performing the receiving and transferring steps asynchronously.

13. The method of claim 11, wherein the data communications device is coupled to network, the network is coupled to one or more other computers, and the remote device is one of the other computers.

14. The method of claim 13, further comprising the step of returning status on the transferred data to the remote device using capabilities of the network.

15. An article of manufacture comprising a computer program carrier readable by a computer and embodying one or more instructions executable by the computer to perform a method for transferring data in a computer, the method comprising the steps of:

(a) receiving a communications request from a calling computer program executed by the computer;

(b) transferring data associated with the received communications request directly to and from an address space of the calling computer program to and from a remote device via a data communication device connected to the computer, thereby eliminating use of intermediate buffers obtained from an address space of an operating system executed by the computer wherein the transferred data includes header information identifying the communications request it is associated with so that a plurality of communications requests can exist concurrently; and (c) managing the received communications request using one or more queues stored in the memory of the computer, wherein the queues are selected from a group of send queues comprising an active request send queue, a completed request send queue, and a global pending request send queue.

16. An article of manufacture comprising a computer program carrier readable by a computer and embodying one or more instructions executable by the computer to perform a method for transferring data in a computer, the method comprising the steps of:

(a) receiving a communications request from a calling computer program executed by the computer;

(b) transferring data associated with the received communications request directly to and from an address space of the calling computer program to and from a remote device via a data communication device connected to the computer, thereby eliminating use of intermediate buffers obtained from an address space of an operating system executed by the computer wherein the transferred data includes header information identifying the communications request it is associated with so that a plurality of communications requests can exist concurrently; and (c) storing the data in a predefined amount of the address space of the operating system prior to receiving the communications request.

TABLE 1

| Outcome | Description |
| --- | --- |
| HPI_OK | The request completed successfully. |
| HPI_ENOMEM | HPI was unable to obtain enough memory (or another resource) to complete the request. If an HPI_ASYNC_WRITE request fails with this status, a resource was unavailable on either the sending host or the receiving host. This status should be viewed as a "flow control" indication. Ie., the sender should "back off" and try again later. |
| HPI_EBUFOVFLW | A receive request overflowed the receive buffer. The extra data was thrown away. Otherwise, the operation was a success. |
| HPI_CANCELED | The request was canceled by an HPI_CANCEL ioctl. |
| HPI_EFAULT | An internal (operating system) error prevented the request from completing. |
| HPI_HOSTDOWN | The specified destination host is down. |
| HPI_HPIDOWN | HPI is down on the specified destination host. |
| HPI_PORTDOWN | The specified port is not open on the. destination host. |

TABLE 2

| Cancel Flags | Description |
| --- | --- |
| HPI_CANCEL_RCV_PEND | Cancel all pending receives on this port. The requests are completed with a value of HPI_CANCELED in their cmplt_status fields. |
| HPI_CANCEL_RCV_UNATT | Remove all items from the unattached message queue for this port. These messages are thrown away. |
| HPI_CANCEL_RCV | This is the combination of the above two flags. |
| HPI_CANCEL_SND_PEND | Cancel all pending sends on this port. The requests are completed with a value of HPI_CANCELED in their cmplt_status fields. |
| HPI_CANCEL_SND | This is equivalent to HPI_CANCEL_SND_PENDING and is included for compatibility with the Unix version of HPI. |
| HPI_CANCEL_ALL | This is the combination of HPI_CANCEL_RCV and HPI_CANCEL_SND. All send requests, receive requests, and unattached messages are deleted from this port. |

\* \* \* \* \*